(12) United States Patent
Rajkotia et al.

(10) Patent No.: US 9,577,923 B2
(45) Date of Patent: Feb. 21, 2017

(54) ADVANCED GATEWAY FOR MULTIPLE BROADBAND ACCESS

(71) Applicant: QUALCOMM Incorporated, San Diego, CA (US)

(72) Inventors: Purva R. Rajkotia, Orlando, FL (US); Todd D. Antes, San Jose, CA (US); Srinivas Katar, Gainesville, FL (US); Hassan Afkhami, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 799 days.

(21) Appl. No.: 13/827,811

(22) Filed: Mar. 14, 2013

(65) Prior Publication Data

US 2014/0269304 A1 Sep. 18, 2014

(51) Int. Cl.
*H04L 12/801* (2013.01)
*H04L 12/725* (2013.01)
*H04W 40/12* (2009.01)

(52) U.S. Cl.
CPC .............. *H04L 45/30* (2013.01); *H04W 40/12* (2013.01)

(58) Field of Classification Search
CPC ....................................................... H04L 47/12
USPC .................................................. 370/235, 230
See application file for complete search history.

(56) References Cited

U.S. PATENT DOCUMENTS

| | | | |
|---|---|---|---|
| 7,826,466 B2 | 11/2010 | Patella et al. | |
| 7,860,528 B2 * | 12/2010 | Pan ....................... | H04W 88/16 370/328 |
| 2007/0104168 A1 * | 5/2007 | Polson .................. | H04W 28/08 370/338 |
| 2009/0129369 A1 * | 5/2009 | Turk .............................. | 370/352 |
| 2009/0141631 A1 * | 6/2009 | Kim et al. ..................... | 370/235 |
| 2011/0153815 A1 * | 6/2011 | Aoki .............................. | 709/224 |
| 2012/0147899 A1 | 6/2012 | Du et al. | |
| 2012/0257633 A1 | 10/2012 | Gupta et al. | |
| 2013/0114409 A1 * | 5/2013 | Iovanna .................. | H04L 45/02 370/235 |

FOREIGN PATENT DOCUMENTS

| | | |
|---|---|---|
| CN | 101645857 A | 2/2010 |
| EP | 2418891 A1 | 2/2012 |

\* cited by examiner

*Primary Examiner* — Man Phan
*Assistant Examiner* — Pamit Kaur
(74) *Attorney, Agent, or Firm* — DeLizio Law, PLLC

(57) ABSTRACT

An advanced gateway for multiple broadband access can include a plurality of broadband network interfaces. The advanced gateway can route data from a local network interface to a broadband network interface when a performance attribute of the broadband network meets or exceeds a data characteristic of data conveyed through the local network interface. In another embodiment, a first advanced gateway can send a portion of data received through the local network interface to a second advanced gateway when performance attributes associated with the first advanced gateway cannot meet or exceed a data characteristic of data received through a local network interface of the first advanced gateway. In yet another embodiment, an advanced gateway can receive commands from service providers, determine a recipient device for the command and forward the command to the recipient device through a device interface coupled to the recipient device.

43 Claims, 9 Drawing Sheets

ADVANCED GATEWAY FOR MULTIPLE BROADBAND ACCESS

BACKGROUND

Embodiments of the inventive subject matter generally relate to the field of communication systems and, more particularly, to advanced gateway architecture for use in a communication network.

A network gateway can provide an interface between local networks and broadband networks. Local networks can provide connectivity in a local area or region such as a residence or small office. Broadband networks generally provide connectivity to relatively high bandwidth network resources such as websites, servers, gaming resources, Internet resources, email and the like. Some broadband networks or interfaces however, may not be capable of meeting one or more traffic characteristics associated with a local network. If the local network is routed to a broadband network that cannot meet a data characteristic, data can be lost, or performance can be reduced and a user can be frustrated with poor performance.

SUMMARY

Various embodiments are disclosed of an advanced gateway that includes two or more broadband interfaces and at least one local network interface. In some embodiments, the advanced gateway can select a broadband interface to carry data traffic from the local interface when a performance attribute of the broadband interface meets or exceeds a data characteristic of the data traffic.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
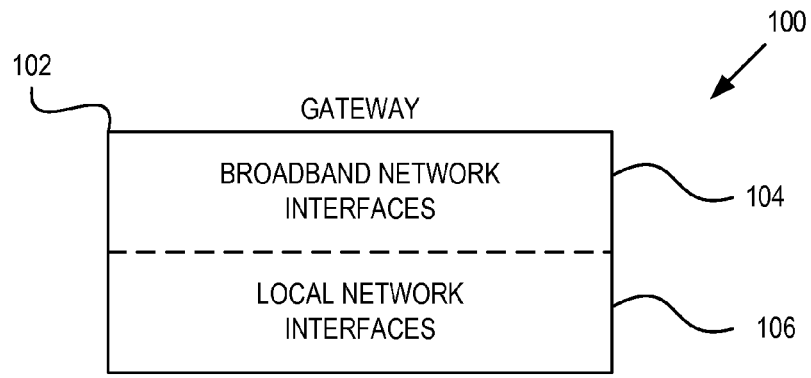
FIG. 1 is a simplified block diagram of one embodiment of an advanced gateway for use in a communication network.

The description that follows includes exemplary systems, methods, techniques, instruction sequences and computer program products that embody techniques of the present inventive subject matter. However, it is understood that the described embodiments may be practiced without these specific details. For instance, although examples refer wireless networks operating in compliance with IEEE 802.11 specifications, any technically feasible wireless networks should be considered. In other instances, well-known instruction instances, protocols, structures and techniques have not been shown in detail in order not to obfuscate the description.

A network gateway can provide an interface between local networks and broadband networks. Local networks can provide connectivity in a local area or region such as a residence or a small office, for example. Broadband networks generally provide connectivity to relatively high bandwidth network resources such as websites, servers, gaming resources, Internet resources, email and the like.

Local networks can include wired networks such as traditional Ethernet networks, coaxial cable based networks such as networks following Multimedia over Coax Alliance (MoCA) specifications and other technically feasible conductor based networks. Local networks can also include wireless networks such as Wi-Fi compliant networks, networks conforming to any of the IEEE 802.11 family of specifications, Zigbee®, femtocell, BLUETOOTH® (Bluetooth) and other technically feasible wireless networks.

Connection to broadband networks can be made through wired interfaces that can include cable modems, digital subscriber line (DSL) modems, fibre optic interfaces and the like. Broadband networks can also be connected through wireless interfaces such as those described above in conjunction with local area networks and can also include cellular modems and radios and satellite links.

One embodiment of an advanced gateway can include a plurality of broadband network interfaces and at least one local network interfaces. The advanced gateway can selectively route some or all data from the local network interface to one or more broadband interfaces when the selected broadband interfaces include one or more performance attributes that meet or exceed desired data characteristic associated with local network data traffic. Traffic characteristics and performance attributes can include network bandwidth, data latency, network round trip time, security characteristics and the like.

In another embodiment, the advanced gateway can communicate with other advance gateways and route some or all local data traffic to the other advanced gateways. In other words, multiple advanced gateways can be used to increase bandwidth performance and to meet or exceed requirements from one or more user devices coupled to local network interfaces.

In yet another embodiment, the advanced gateway can provide a single interface to multiple physical interfaces to networks in a residential or commercial application. In one embodiment, service providers can issue commands to the advanced gateway through the single interface. The service provider commands can be forwarded to particular physical networks by a forwarding entity. Responses to service provider commands can be returned to sending service providers. In one embodiment, one or more of the multiple physical interfaces can conform to IEEE 1905.1 standards.

FIG. 1 is a simplified block diagram 100 of one embodiment of an advanced gateway 102 for use in a communication network. Advanced gateway 102 can provide a connectivity bridge between a plurality of local networks and a plurality of broadband networks in many applications such as in residential, small business, home office, or other commercial or non-commercial applications. Advanced gateway 102 can include broadband network interfaces 104 and local network interfaces 106. Local network interfaces 106 can connect user devices such as laptops, cell phones, tablet computers, media players, smart appliances, chargers, home automation devices, security devices such as fire, intrusion sensors and the like, and can couple them to at least one broadband network. Local networks (not shown) and interfaces 106 can include wired technology (data is transferred through a physical wire connection) or wireless technology (data is transferred through wireless transceivers). Broadband network interfaces 106 can couple relatively high-speed network resources to one or more local networks through one or more of the plurality of local network interfaces. Similar to local network interfaces 106, broadband network interfaces 104 can also include wired or wireless technology.

Figure 2:
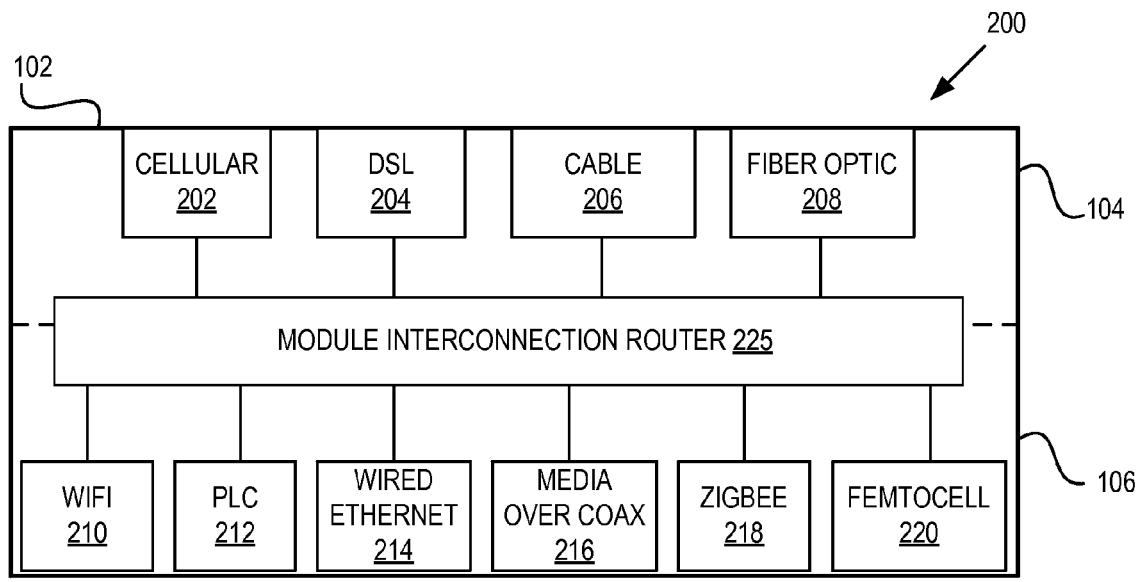
FIG. 2 is a block diagram showing a more detailed diagram of one embodiment of the advanced gateway.

FIG. 2 is a block diagram 200 showing a more detailed diagram of one embodiment of advanced gateway 102. As described above, advanced gateway 102 can include broadband network interfaces 104 and local network interfaces 106. Broadband network interfaces 104 can include a plurality of interfaces that can couple to relatively high-speed networks. By way of example and not limitation, broadband high-speed networks can deliver digital content, digital media, provide access to email, web sites or other Internet or cloud-based content. In some embodiments, separate service providers can be coupled to separate broadband network interfaces 104.

In one embodiment, broadband network interfaces 104 can include a cellular modem 202, DSL modem 204, cable modem 206 and fibre optic transceiver 208. The broadband network interfaces 104 described herein are not meant to be limiting, but merely demonstrative of possible broadband network interfaces 104. Cellular modem 202 can couple to cellular radio based broadband networks following 3G or 4G LTE (Long Term Evolution, as described by $3^{rd}$ Generation Partnership Project—3GPP) standards, CDMA2000 standards or any other technically feasible cellular radio based technologies. DSL modem 204 can couple to DSL enabled phone lines. Cable modem 206 can couple to a cable based networks. Fibre optic interface 208 can couple to relatively high-speed networks through a fibre optic cable (not shown). Each interface in broadband network interfaces 104 can be coupled to a service provider. Oftentimes, different service providers can be selected for each interface in broadband network interfaces 104. For example, a cellular voice and data service provider can be coupled to cellular modem 202 while a cable television provider can provide voice, data and digital media while coupled to cable modem 206.

In one embodiment, local network interfaces 106 can include Wi-Fi interface 210, PLC interface 212, Ethernet interface 214, media over coaxial cable (MoCA) interface 216, Zigbee interface 218 and femtocell interface 220. The local network interfaces 106 described herein are not meant to be limiting, but merely demonstrative of possible local network interfaces. Wi-Fi interface 210 can wirelessly transfer data between other wireless interfaces such as those included in computing devices, cell phones, and any other wireless communication enabled devices. In one embodiment, Wi-Fi interface 210 can conform to one or more of the specifications described by the IEEE 802.11 family of specifications. In other embodiments, Wi-Fi interface 210 can include other forms of wireless data transfer such as Bluetooth, near field communications (NFC) or any other technically feasible wireless data transfer method. PLC interface 212 can transfer data through a power line network between other devices that also include a PLC interface (not shown). PLC interface 212 can conform to one or more power line communication standards such as one described by the HomePlug® alliance, including HomePlug AV. Wired Ethernet interface 214 can transfer data between other devices that also include a wire-based Ethernet interface (not shown). Wired Ethernet interface can use twisted pair, coaxial cable, RJ45, category 5 (cat 5) cable or any other technically feasible wired Ethernet conductor. In some embodiments, Wired Ethernet interface may conform to the IEEE 802.3 specification.

MoCA interface 216 can transfer data between other devices including MoCA interfaces, such as televisions, media servers and the like, through a coaxial cable. ZigBee interface 218 can transfer data between other devices that include a ZigBee wireless interface (not shown). In one embodiment, ZigBee can be a low power wireless protocol described by a specification set forth by the ZigBee Alliance. Femtocell interface 220 may couple to cell phones in a local area near advanced gateway 102 and can transfer voice and data between cell phones and another network, such as a broadband network. In one embodiment, femtocell interface 220 can reduce loading on nearby cell towers by routing cell phone data to other broadband networks, such as those in broadband network interface 104.

Figure 9:
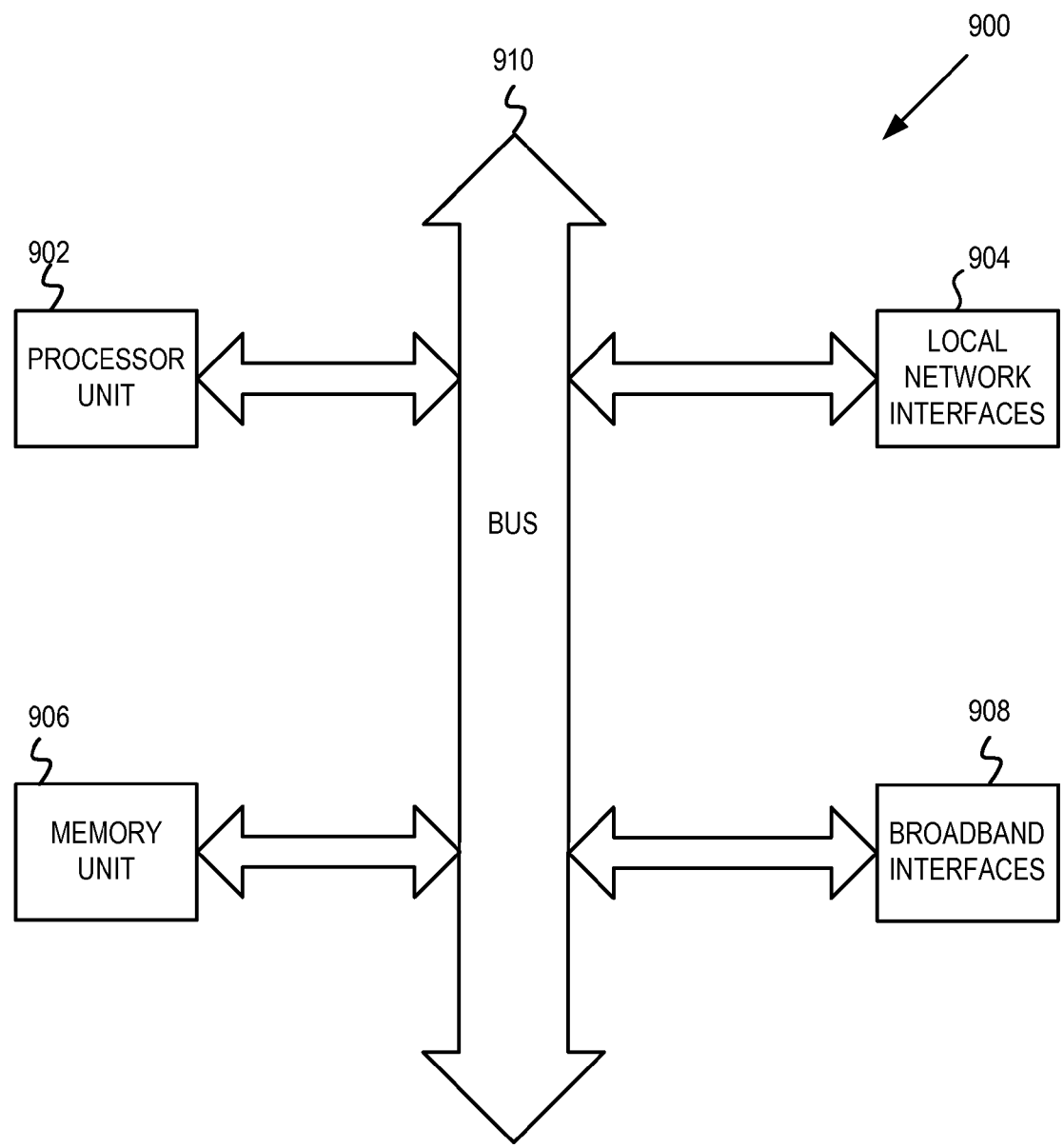
FIG. 9 is a block diagram of an exemplary embodiment of an advanced gateway for use with network communications.

Advanced gateway 102 can also include module interconnection router 225 that couples one or more of the interfaces within broadband interfaces 104 to one or more interfaces within local network interfaces 106. In one embodiment, module interconnection router 225 can act as a cross point switch and route any interface included in broadband interface 104 to any interface included in local network interface 106. In another embodiment, module interconnection router 225 can be implemented with signal multiplexers coupled to interfaces included in broadband interface 104 and local network interface 106. In yet another embodiment, module interconnection router 225 can be implemented with a bus or any other technically feasible logic components and/or modules. In still other embodiments, module interconnection router 225 can be implemented with any technically feasible interconnection technology. FIG. 9 below illustrates one embodiment of advanced gateway 102.

Advanced gateway 102 can route data from an interface included in local network interfaces 106 to a particular interface included in broadband network interface 104. Data associated with a particular interface in local network interfaces 106 can include a traffic characteristic that describes, at least in part, a property of the associated data. The traffic characteristic associated with an interface in local interfaces 106 can be used, at least in part, to select an interface in broadband network interface 104. In one embodiment, a broadband interface is selected when the broadband interface includes a performance attribute that can meet or exceed a traffic characteristic associated with an interface in local interfaces 106.

In one embodiment, traffic characteristics can include one or more quality characteristics that can be associated with local network data such as minimum bandwidth (throughput), data latency (delivery delay), a maximum packet loss, a data jitter or other quality of service (QoS) measurements. In other embodiments, traffic characteristics can include security characteristics, critical importance and the like.

Traffic characteristics of traffic associated with an interface in local network interfaces 106 can be determined indirectly by the advanced gateway 102 by monitoring data currently being transferred through an interface in local network interfaces 106. For example, sustained and peak bandwidth characteristics can be determined relative to a particular interface in local network interfaces 106. Traffic characteristics can also be determined directly when a device coupled to an interface in local network interfaces 106 sends one or more messages including a desired traffic characteristic. For example, a computing device coupled to Wi-Fi interface 210 can be streaming media content from a service provider. In this example, if the media content may consume 6 Mb/sec, the computing device can send a message to Wi-Fi interface 210 that the computing device is running an application consuming approximately 6 Mb/sec.

Traffic characteristics can describe quality of service characteristics that can be associated with a data traffic stream. For example, round-trip-time (RTT) can describe an amount of time for data to be sent to a particular destination (such as a server) and time for an acknowledgement to be received. Another quality characteristic can be an amount of time required to respond to a ping command. Yet another quality characteristic can be a maximum data latency. Data latency describes a delay in transit time of data from a sending point to a receiving point.

In other embodiments, other messages can be sent indicating other traffic characteristics such as security characteristics and critical importance. A security characteristic can describe traffic that can benefit from relatively more security to help prevent unintended snooping, listening or access to the traffic. In one embodiment, security sensitive traffic can be limited to non-wireless interfaces. A critical traffic characteristic can describe traffic that includes relatively critical information such as information related to a smoke or fire alarm such as may come from a home with fire or security monitoring. In one embodiment, critical traffic can be sent through two or more broadband interfaces to add redundancy and help ensure critical traffic data delivery. In one embodiment, critical traffic data is sent contemporaneously through two or more broadband interfaces. A VoIP traffic characteristic can describe voice traffic that can preferentially be carried through cellular networks. Thus, when a VoIP traffic characteristic is determined, a cellular broadband interface such as cellular modem 202 can be select to carry VoIP traffic.

Similar to traffic characteristics, performance attributes of interfaces included in broadband network interface 104 can be determined directly or indirectly. For example, advanced gateway 102 can determine performance attributes for an interface indirectly by measuring data bandwidth through that particular interface, including broadband network interface 104. The advanced gateway 102 can send and measure a predetermined amount of data to a predefined server through each interface in the broadband network interfaces 104. In another embodiment, advanced gateway 102 can maintain statistics for each particular interface as the interface operates to determine performance attributes. In yet another embodiment, performance attributes can be provided directly by service providers that can indicate, e.g., bandwidth, maximum data latency and jitter.

In one embodiment, advanced gateway 102 can select an interface included in broadband network interfaces 104 having at least one performance attribute that meets or exceeds a related traffic characteristic of an interface included in local network interfaces 106. In this way, data can be routed between a selected broadband network interface and a selected local network interface when performance of a broadband network interface meets or exceeds traffic characteristics at a local network interface. In one embodiment, data between interfaces included in broadband network interfaces 104 and interfaces included in local network interfaces carried by module interconnection router 225. If more than one broadband network interface 104 includes a performance attribute that meets or exceeds the related traffic characteristic, then advanced gateway 102 can select the broadband network interface 104 with a performance attribute that exceeds the traffic characteristic by the largest amount. For example, if a traffic characteristic is 6 Mb/s, a first performance attribute is 4 Mb/s and a second performance attribute is 14 Mb/s, then advanced gateway 102 can select the broadband network interface 104 with the 14 Mb/s performance attribute.

In one embodiment, advanced gateway 102 can periodically select an interface included in broadband network interfaces 104 that meets or exceeds local network traffic characteristics. For example, advanced gateway 102 can periodically retest operating conditions and select network interfaces accordingly. In other embodiments, the advanced gateway 102 can select network interfaces on a packet by packet basis.

Figure 3:
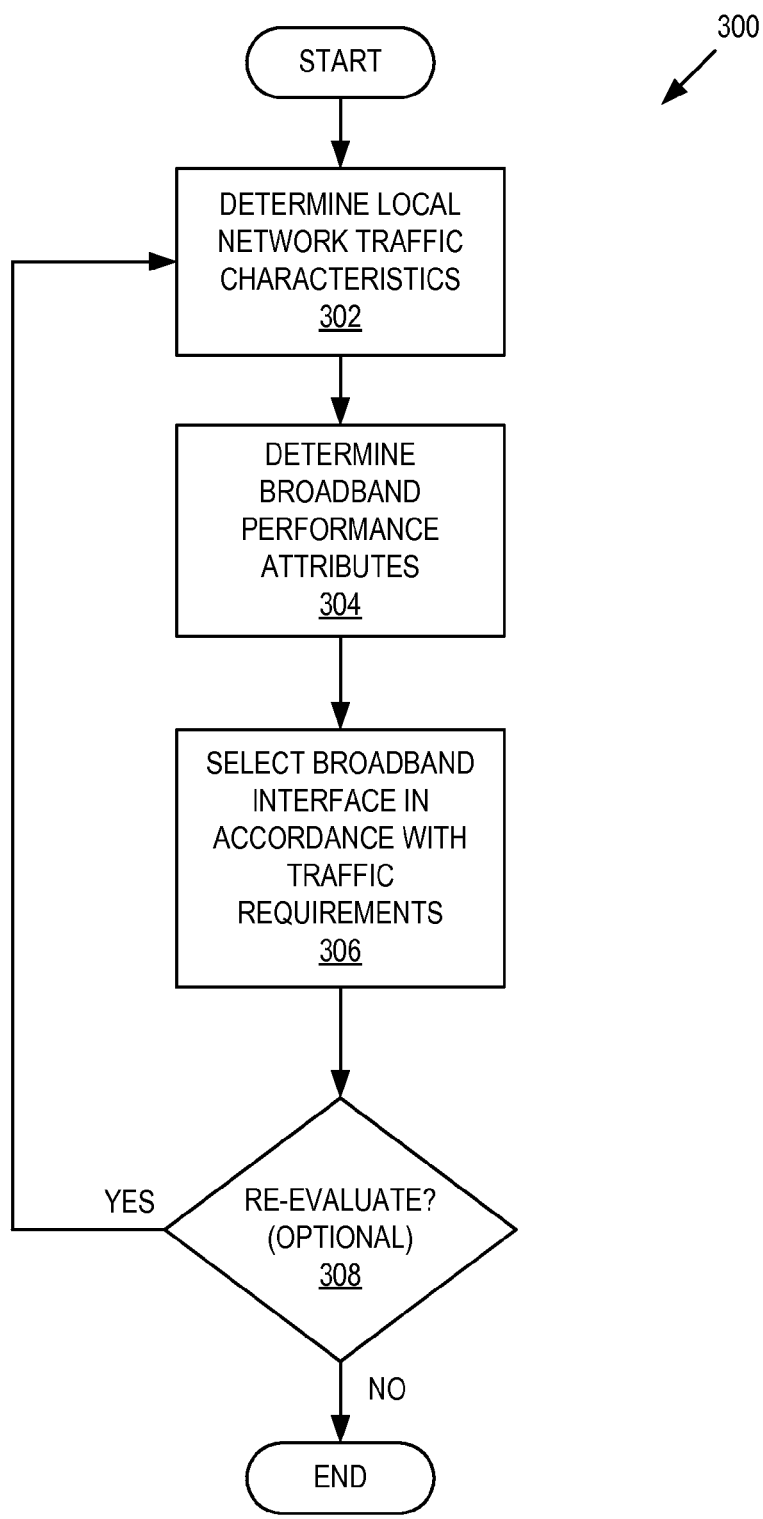
FIG. 3 is a flow diagram illustrating exemplary operations for the advanced gateway in a communication network.

FIG. 3 is a flow diagram 300 illustrating exemplary operations for advanced gateway 102 operating in a communication network. The method of FIG. 3 is described with reference to the systems and components described in FIGS. 1 and 2 (for illustration purposes and not as a limitation of the invention). The example operations can be carried out by one or more components in advanced gateway 102, such as broadband interfaces 104 or local network interfaces 106 or by a processor within advanced gateway 102 or an interface included in broadband interfaces 104 or local network interfaces 106. Beginning in block 302, traffic characteristics associated with one of the interfaces included in local network interfaces 106 is determined. As described above, traffic characteristics can include quality characteristics such as bandwidth, round trip time, security characteristics or critical importance, and can be determined directly or indirectly. Proceeding to block 304, performance attributes for each interface included in broadband interfaces 104 can be determined. As described above, performance attributes can have similar values compared to traffic characteristics and can be determined directly or indirectly.

Proceeding to block 306, an interface included in the broadband network interfaces 104 can be selected for use with the local network interface referenced in block 302. In one embodiment, an interface included in broadband network interfaces 104 is selected when the performance attributes of the selected interface in broadband network interfaces 104 meets or exceeds the traffic characteristics of the interface included local network interface 106. For example, if a traffic characteristic is a bandwidth characteristic of 6 Mb/s, a first performance attribute is 6 Mb/s and a second performance attribute is 1 Mb/s, then the broadband interface associated with the first performance attribute can be selected since the first performance attribute at least meets the traffic characteristic. In another embodiment, if more than one performance attribute meets the traffic characteristic, then the performance characteristic that exceeds the traffic characteristic by the largest amount can be selected. For example, if a traffic characteristic is a bandwidth characteristic of 6 Mb/s, a first performance attribute is 6 Mb/s and a second performance attribute is 9 Mb/s, then the broadband network associated with the second performance attribute can be selected since the second performance attribute exceeds the traffic characteristic by the largest amount.

Proceeding to block 308, if a re-evaluation of the local network interface referenced in block 302 and broadband network interfaces reference in block 304 is desired, then flow can return to block 302 and the process of blocks 302-306 can be repeated. If no re-evaluation is desired the flow can end. In some embodiments, block 308 can be optional and can be omitted.

In one embodiment, flow 300 can be executed serially for each interface included in local network interfaces 106. In another embodiment, flow 300 can be executed in parallel for each interface included in local network interfaces 106. When executed in parallel, interactions within individual broadband interfaces from separate interfaces included in local network interfaces 106 can be reviewed. For example, if two or more local network interfaces are routed to a single interface in broadband network interfaces 104, advanced gateway 102 can determine if the performance attributes are sufficient for the traffic characteristic from the interfaces in local network interfaces 106.

In one embodiment, the routes between broadband interfaces 104 and local network interfaces 106 can be re-evaluated periodically (e.g., once a minute) or can be evaluated each time a data packet is transferred. In another embodiment of advanced gateway 102, two or more advanced gateways 102 can be used cooperatively to satisfy traffic characteristics that can be from a single user local network interface. This embodiment is described in detail below in conjunction with FIG. 4.

Figure 4:
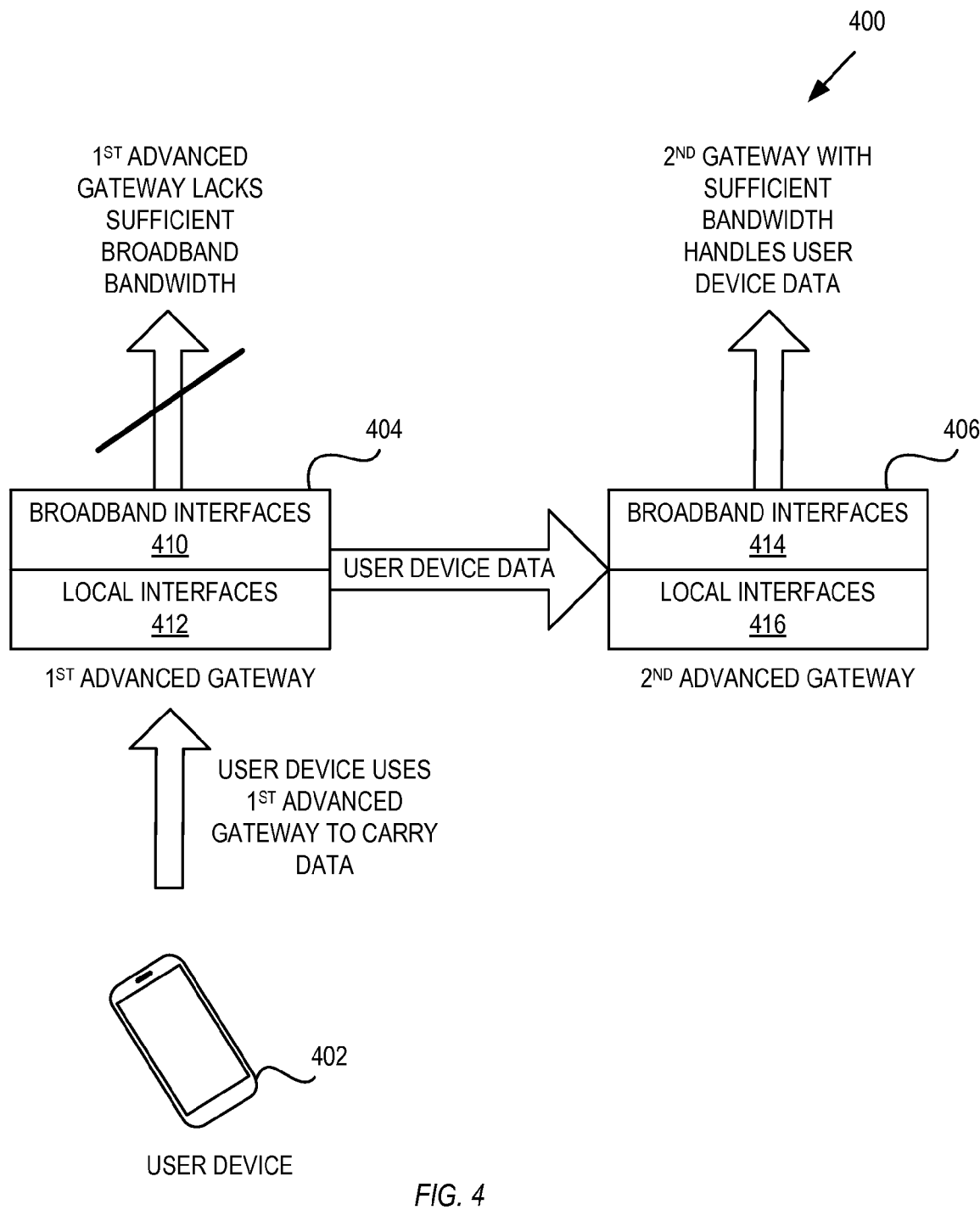
FIG. 4 is a simplified block diagram of another embodiment of an advanced gateway for use in a communication network.

FIG. 4 is a simplified block diagram 400 of another embodiment of an advanced gateway for use in a communication network. Block diagram 400 illustrates user device 402 communicating with first advanced gateway 404 which in turn communicates with second advanced gateway 406 to access broadband networks. As described above, user device 402 can be a laptop, cell phone, tablet computer, media player, etc. In one embodiment, advanced gateways 404 and 406 can be substantially identical to advanced gateway 102 shown in FIGS. 1 and 2. In another embodiment, first advanced gateway 410 can differ from second advanced gateway 412 by having a different group of interfaces. For example, first advanced gateway 404 may have broadband network interfaces 410 that do not include cellular modem 202 while second advanced gateway 406 may have broadband network interfaces 414 that include cellular modem 202. In a similar manner, first advanced gateway 404 can include local network interfaces 412 and second advanced gateway 406 can include local network interfaces 416. Capabilities of interfaces within advanced gateways can differ between first 404 and second 406 advanced gateways. For example, bandwidth capabilities of DSL modem 204 in first advanced gateway 404 can be less than bandwidth capabilities of DSL modem 204 in second advanced gateway 406.

By way of example and not limitation, user device 402 can communicate with one of the interfaces within local network interfaces 412 included in first advanced gateway 404. First advanced gateway 404 can be selected by user device 402 because of the location of first advanced gateway 410 with respect to user device 402. For example, first advanced gateway 404 can be relatively near to user device 402 and can form relatively strong wireless communication channels.

User device 402 can communicate with a local interface 412 in first advanced gateway 404. If traffic characteristics of local interface 412 serving user device 402 cannot be satisfied by performance attributes of broadband network interfaces 410, then first advanced gateway 404 can communicate with one or more advanced gateways within a communication range. For example, if the data characteristic is a minimum bandwidth and the broadband network interfaces 410 cannot support the specified minimum bandwidth, then first advanced gateway can communicate with another advanced gateway.

In this example, first advanced gateway 404 communicates with second advanced gateway 406. Communications between first advanced gateway 404 and second advanced gateway 406 are carried through any technically feasible interfaces included in first advanced gateway 404 and second advanced gateway 406. For example, a PLC interface 212 in local interfaces 412 can communicate with PLC interface 212 included in local interfaces 416. In one embodiment, communications are established after first advanced gateway 404 locates the second advanced gateway 406. First advanced gateway 404 can locate second advanced gateway 406 with any technically feasible means. In one embodiment, first advance gateway 404 can listen for beacon signals transmitted from second advanced gateway 406, particularly when both first 404 and second 406 advanced gateways include Wi-Fi interfaces. In another embodiment, first advanced gateway 404 can monitor a power line interface to determine if a second advanced gateway 406 is within a communication range of first advanced gateway 404.

If second advanced gateway 406 does not include at least one broadband network interface 414 with performance attributes that meet or exceed traffic characteristics from user device 402 (via first advanced gateway 410), first advanced gateway 404 can search for another advanced gateway within communication range. On the other hand, if second advanced gateway 406 does include at least one broadband network interface 414 with performance attributes that meet or exceed traffic characteristics from user device 402, then first advanced gateway 404 can route at least a portion of the data from user device 402 to second advanced gateway 406. In one embodiment, the data can be sent through interfaces used to search and locate the second advanced gateway 406. In other embodiments, data can be sent through any technically feasible interfaces included in first 404 and second 406 advanced gateways. When second advanced gateway 406 receives data from first advanced gateway 404, then an interface included in broadband network interfaces 414 at the second advanced gateway 406 can be selected with performance attributes that meet or exceed traffic characteristics for data from first advanced gateway 410 (which are traffic characteristics related to user device 402).

In one embodiment, the operator of the first advanced gateway can be different from the operator of the second advanced gateway (e.g., different households). In this manner, the first household can take advantage of resources that can be available through the second advanced gateway of the second household. In some embodiments, a service provider can arrange for the second household to not be billed for the data routed from the first household (i.e., data routed from the first advanced gateway), while the first household is billed for the services provided though the second advanced gateway. In one embodiment, the first advanced gateway can access the second advanced gateway without intervention from the operator of the second advanced gateway.

Figure 5A:
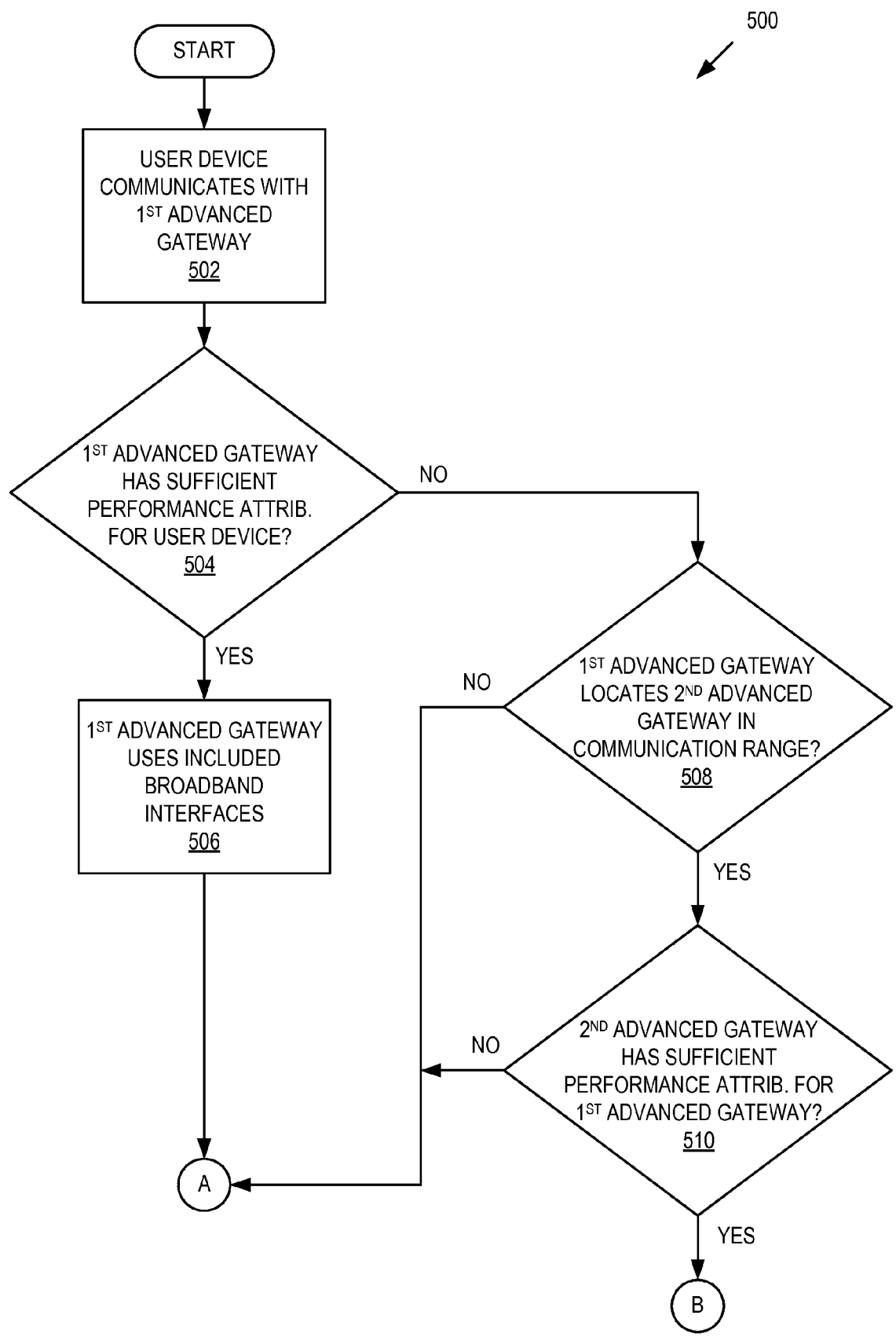
FIGS. 5A-5B together illustrate a flow diagram illustrating exemplary operations for the advanced gateway shown in FIG. 4.
Figure 5B:
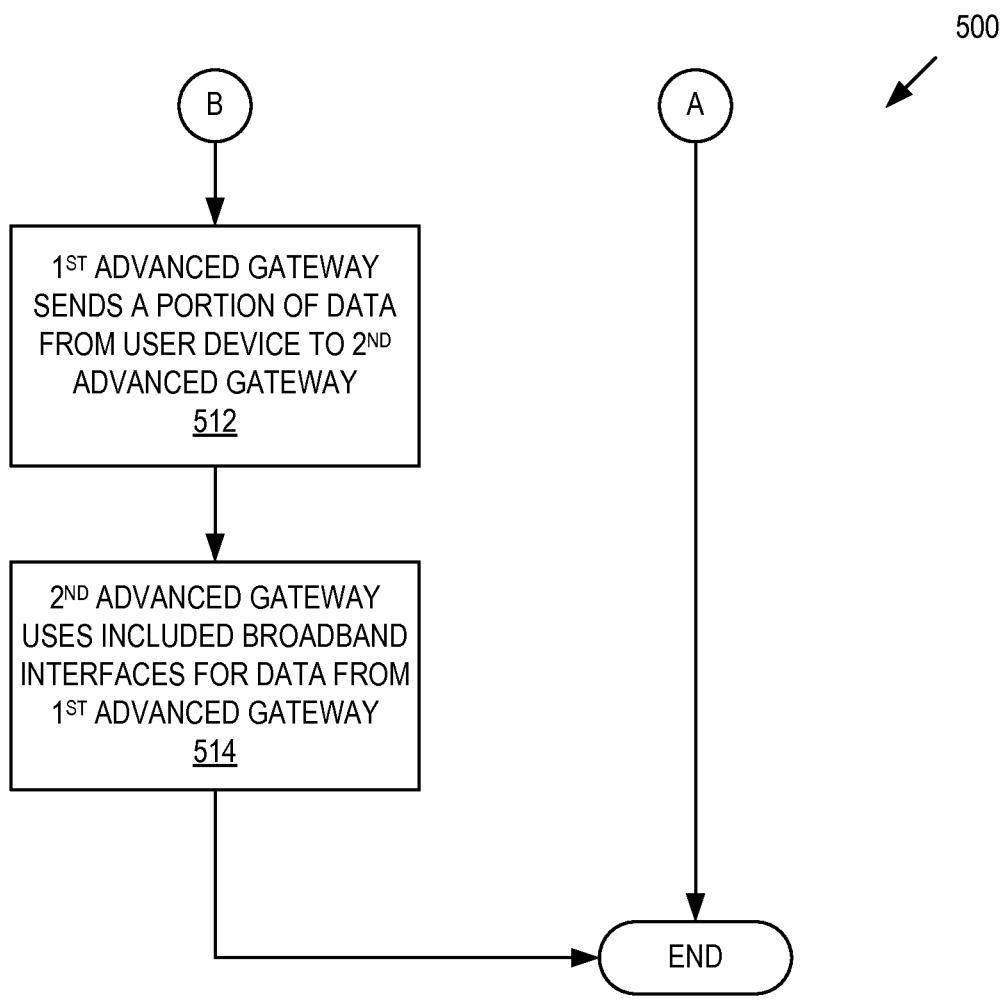

FIGS. 5A-5B together illustrate a flow diagram 500 illustrating exemplary operations for the advanced gateway shown in FIG. 4. The method of FIG. 5 is described with reference to the systems and components described in FIGS. 4 (for illustration purposes and not as a limitation of the invention). The example operations can be carried out by one or more components in advanced gateways 404, 406 or by a processor within advanced gateways 404 or 406. Starting in block 502, user device 402 can communicate with first advanced gateway 404. As described above, user device 402 can communicate through local network interface 412 included in first advanced gateway 410. Proceeding to block 504, first advanced gateway 410 determines if there is a sufficient performance attribute included in the one or more broadband network interfaces 104 included within first advanced gateway 410. For example when user device 402 communicates with first advanced gateway 410, first advanced gateway 410 can determine traffic characteristics of user device 402. If there is sufficient performance attributes, then proceeding to block 506, the first advanced gateway 410 selects one or more broadband network interfaces 104 within first advanced gateway 410 and the flow ends.

Returning to block 504, if first advanced gateway does not have sufficient performance attributes, then the flow proceeds to block 508, where first advanced gateway 410 determines if a second advanced gateway 406 is within communication range. As described above, first advanced gateway 404 can locate and communicate with other advanced gateways, such as second advanced gateway 406 through one or more interfaces included within local 106 and broadband 104 network interfaces. In one embodiment, the first advanced gateway can listen for beacon signals that are broadcast from a second advanced gateway, particularly when the second advanced gateway includes a Wi-Fi interface. In another embodiment, the first advanced gateway can monitor a power line interface to determine if a second advanced gateway is within a communication range of the first advanced gateway. If a second advanced gateway 406 is not within communication range, then the flow ends. On the other hand, if second advanced gateway 406 is within communication range, flow proceeds to block 510 where second advanced gateway 406 determines if one or more broadband network interfaces 414 have performance attributes to meet traffic characteristics of first advanced gateway 404. If second advanced gateway 406 does not have sufficient performance attributes, then the flow ends. On the other hand, if second advance gateway 406 has sufficient performance attributes, the flow proceeds to block 512 where first advanced gateway 404 sends at least a portion of data from user device 402 to second advanced gateway 406. In one embodiment, data from first advanced gateway 404 is sent to second advanced gateway 406 through one or more interfaces included in broadband interfaces 410 or local interfaces 412 to respective broadband interfaces 414 and local interfaces 416. Flow proceeds to block 514 where second advanced gateway 406 uses at least one broadband interface 414 to transfer data from first advanced gateway 404 and the flow ends.

Although, as described above, the flow can end after determining that second advanced gateway 406 does not include interfaces with performance attributes to meet or exceed traffic characteristics from first advanced gateway 404 (block 510), persons skilled in the art will appreciate that the flow can instead return to block 508 where another advanced gateway within communication range can be located.

In yet another embodiment, the advanced gateway can include dedicated local physical interfaces for communicating with a plurality of user devices coupled to the dedicated local physical interfaces. The advanced gateway can also include another physical interface for receiving commands from service providers. The advanced gateway can forward these commands to the appropriate user devices thereby allowing users to access and control the user devices through the service providers. This embodiment is described below in FIG. 6.

Figure 6:
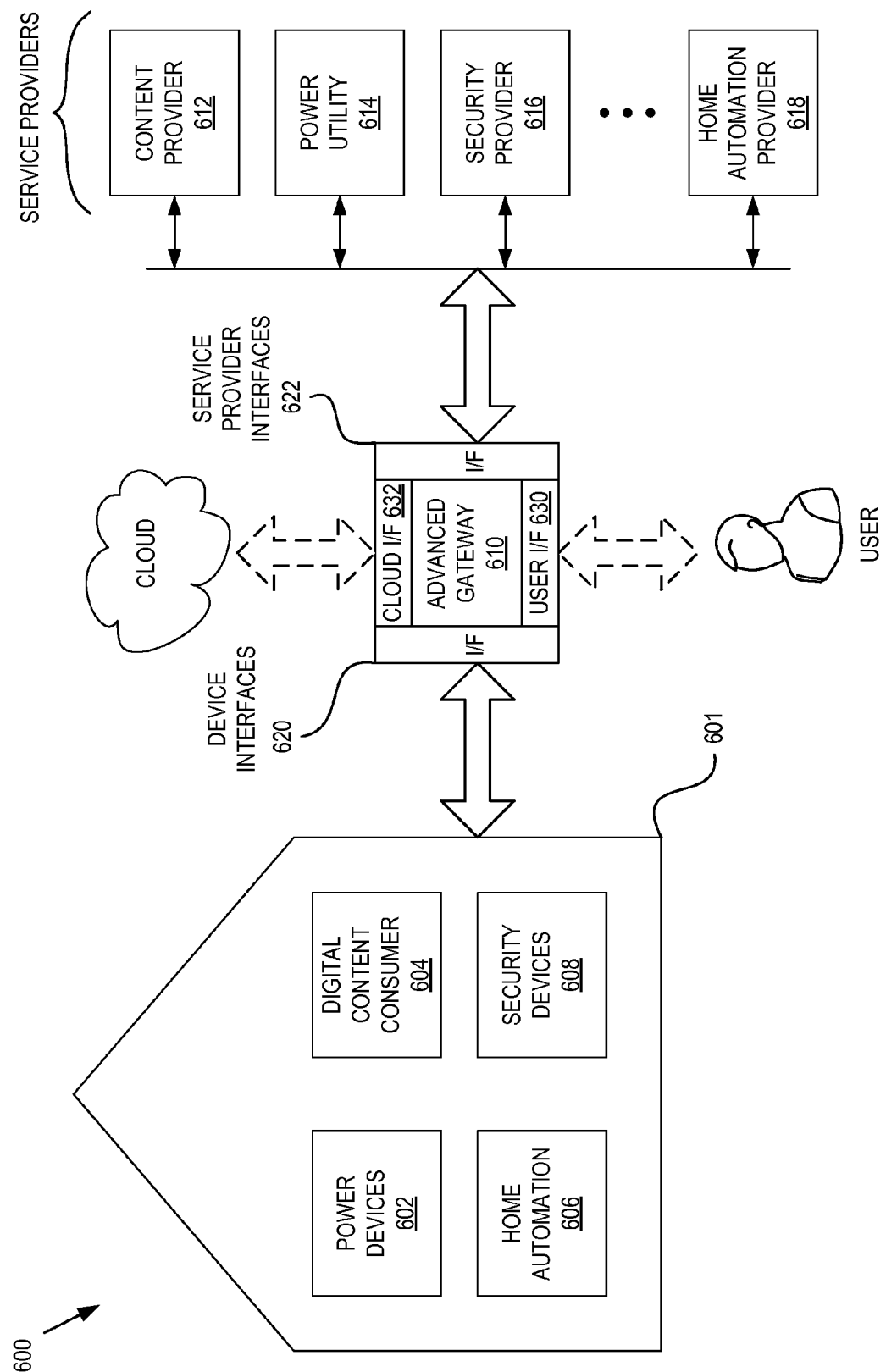
FIG. 6 is a block diagram of yet another embodiment of an advanced gateway for use in network communications.

FIG. 6 is a block diagram 600 of yet another embodiment of an advanced gateway 610 for use in network communications. Advanced gateway 610 is shown coupled to user devices within residence 601 through device interfaces 620. In one embodiment, one or more interfaces included in device interfaces 620 can follow IEEE 1905.1 specifications. In some embodiments, user devices can be within businesses, apartments, multi-tenant dwellings, houses, small home offices or the like. User devices can be any device that can include a network interface that is compatible with at least one network interface in advanced gateway 610.

By way of example and not limitation, a user device can be a power device 602 such as a power outlet or electric car charger. Power devices 602 can be coupled together with a PLC network (not shown) and advanced gateway 610 can include a PLC network physical interface (not shown) that can couple with power devices 602. User devices can be digital content consumers 604. For example, a media playback device, such as a streaming media player, laptop, or game console can be digital content consumers 604. Digital content consumers 604 can be coupled together with MoCA network (not shown) and advanced gateway 610 can include a MoCA network interface (not shown) that can couple with digital content consumers 604.

User devices can also be one or more security monitoring devices 608 that can be linked together with a network (not shown), such as a ZigBee network and advanced gateway 610 can include a ZigBee network interface (not shown) that can couple with security devices 608. In one embodiment, security monitoring devices can be motion sensors, heat sensors, door and window sensors, cameras and the like. User devices can also be home automation devices 606 such as lights, heating and cooling systems, water leak detectors and the like. Home automation devices 606 can be coupled together with a network such as a PLC or X-10® network and advanced gateway 610 can also include a physical network to communicate with home automation devices 606.

Advanced gateway 610 can also include a service provider interface 622 to communicate with various service providers that can provide a service for one or more user devices within residence 601. For example, content provider 612 can provide digital content such as streaming movies, audio or any other feasible digital content for digital content consumers 604. Similarly, power utility 614 can supply power to power devices 602, security provider 616 can monitor security devices 608 and home automation provider 618 can control home automation devices 606.

The devices described above included in residence 60/ are not exhaustive, but exemplary. Other embodiments of residence 601 can include more or fewer devices and can have more or fewer networks for communicating with the included devices.

Advanced gateway 610 provides a service provider interface 622 that provides access to individual networks for power devices 602, digital content consumers, home automation devices 606, security devices 608 and any other technically feasible devices and networks that can be coupled to advanced gateway 610. In one embodiment, service provider interface 622 is separate from an interface at residence 601 configured to receive a service. For example, power for power devices 602 can be delivered through traditional power lines, while power utility 614 can communicate to power devices 602 through device interface

620. Advanced gateway 610 can include other access interfaces such as user interface 630 and cloud interface 632. User interface 630 can enable the user to access, configure or monitor advanced gateway 610. Cloud interface 632 can provide another access pathway for advanced gateway 610. User interface 630 and cloud interface 632 can be optional interfaces as shown by dashed lines in FIG. 6. For example, the user could configure advanced gateway 630 through a keypad and display mounted directly within advanced gateway 610.

Figure 7:
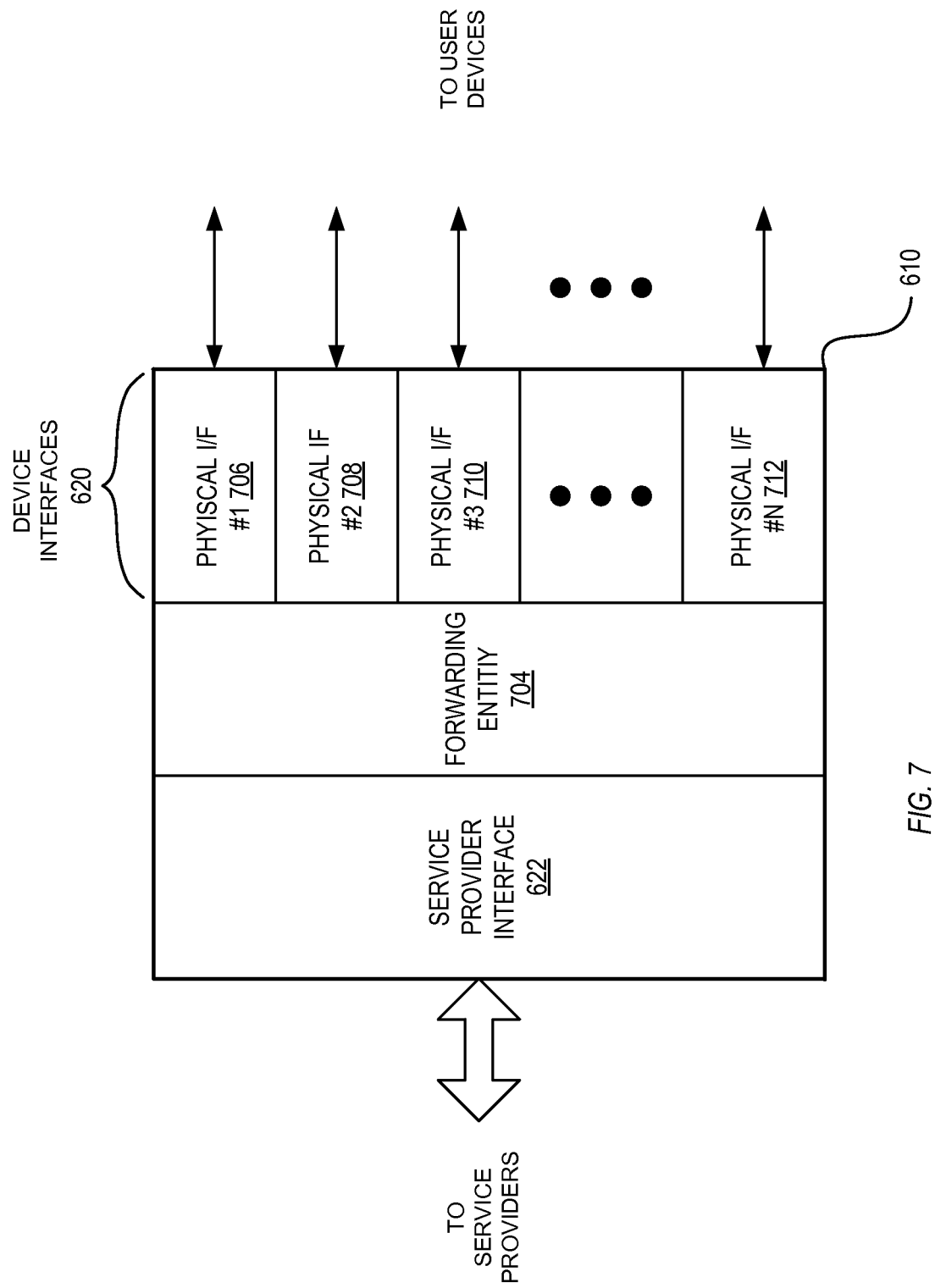
FIG. 7 is block diagram showing details of the embodiment of the advanced gateway shown in FIG. 6.

FIG. 7 is block diagram 700 showing details of advanced gateway 610 shown in FIG. 6. Service providers can access user devices through advanced gateway 610. In one embodiment, service providers can send commands for user devices to advanced gateway 610. The commands can be received by the service provider interface 622 and can be examined by forwarding entity 704. Forwarding entity 704 can determine the end recipient of the command and can route the command to the appropriate physical interface.

One or more physical interfaces for communicating with user device are included in device interfaces 620. In one embodiment, a physical interface is included for each individual physical network in residence 601. By way of example and not limitation, first physical interface 706 can be a Wi-Fi network interface, second physical interface 708 can be a MoCA network interface and third physical interface 710 can be a PLC network interface. The nth physical interface 712 can be any technically feasible physical network interface. In one embodiment, physical network interfaces can be duplicated in advanced gateway 610. For example, there can be two or more PLC network interfaces. Those skilled in the art will appreciate that the exact realization of each physical interface can vary in response to user devices deployed in residence 601. In one embodiment, one or more of the interfaces in physical interfaces 620 can follow IEEE 1905.1 standards.

In one embodiment, forwarding entity 704 can receive a command from a service provider, analyze the command and then forward the command to the appropriate recipient. For example, a user can interact with a website of a service provider to control a user device in residence 601. The service provider, in turn, can send commands to service provider interface 622. To illustrate the example, a user can interact with a power provider website to control a power outlet in residence 601. The user can interact with a website of the power provider. The website can cause commands to be sent to service provider interface 622 of advanced gateway 610. Forwarding entity 704 can forward commands to PLC interface 710. In another embodiment, the forwarding entity 704 can receive messages from user devices in response to the forwarded commands and, in turn, send the response to the service provider. Returning to our example, PLC interface 710 can acknowledge the command through forwarding entity 704 and service provider interface 622.

Advanced gateway 610 can provide a simple interface for a plurality of service providers to send commands, gather information and control user devices. In one embodiment, when simple commands are received by forwarding entity 704, forwarding entity can analyze the commands and act accordingly. In one embodiment a simplified command set comprising Get and Set commands are sent by service providers. Advanced gateway 610 can analyze and execute the commands. Advanced gateway 610 enables a plurality of service providers to access user devices though these simple Get and Set commands.

To illustrate one embodiment of a Get command, a Get power state command is shown below.

Get_pwr_state.req (address) (command 1)

A request (denoted by the req suffix) for a power state is shown in command 1. A service provider can send the command request to advanced gateway 610. The address appearing as an argument can be a user device address. In one embodiment, the address can be a MAC (media access control) address.

Returning to the example, command 1 can be received by service provider interface 622 and command 1 can be analyzed by forwarding entity 704. Forwarding entity 704 can review the command and the address and determine which (if any) physical interface in interfaces 620 should receive the command. After determining which physical interface to use, forwarding entity 704 can send the command to a selected interface in physical interface 620.

If the sent command causes a response message to be sent by the user device, forwarding entity 704 can receive the response from the user device. Forwarding entity 704 can send a response message back to the command sender.

Get_pwr_state.response (address, state, reason code) (response 1)

A response (denoted by the .response suffix) for the power state request of command 1 is shown in response 1. In this example, address can reflect the address of the user device. In one embodiment, address can be the MAC address of the user device. State can be the power state of the user device. Possible states can be power on, power save, and power off. Reason code can provide additional information to the service provider. Possible reason codes can be success, failure or unmatched MAC address.

Similar to get commands, set commands can be sent by service providers to control user devices.

Set_power_state.reg (address) (command 2)

A set power state command request is shown above as command 2. The argument can be a device address as described above. A response can be Set_power_state.confirm(address, reason code) (response 2)

Response 2 can be sent from advanced gateway 610 in response to command 2. The address in the response can be the device address, similar to the address in command 2. The reason code can be success, unavailable power state, unmatched mac address and unsupported power state.

The commands and responses set forth above are merely demonstrative of possible commands and responses that can be sent between service providers and advanced gateway 610 and are not meant to be limiting. Other commands and responses are possible.

Figure 8:
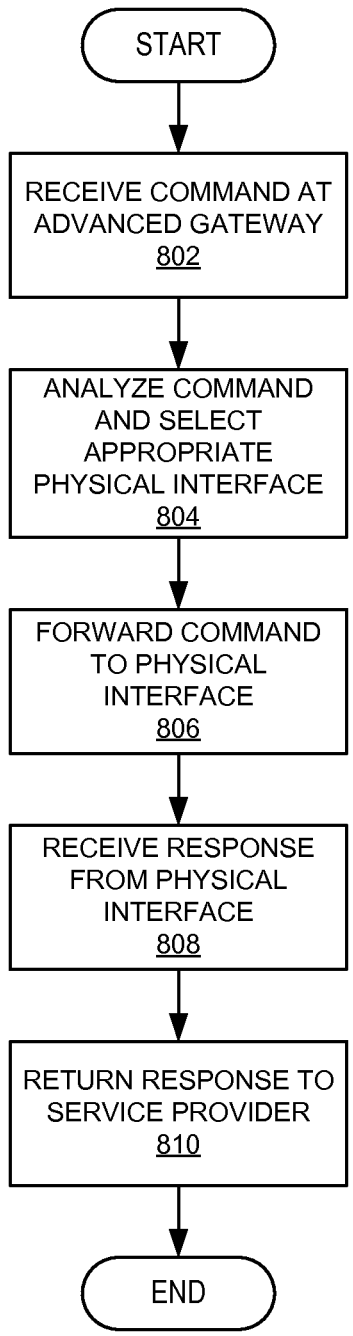
FIG. 8 is a flow diagram illustrating exemplary operations for the advanced gateway shown in FIGS. 6 and 7.

FIG. 8 is a flow diagram 800 illustrating exemplary operations for the advanced gateway 610 shown in FIGS. 6 and 7. The method of FIG. 8 is described with reference to the systems and components described in FIGS. 6 and 7 (for illustration purposes and not as a limitation of the invention). The example operations can be carried out by one or more components in advanced gateway 610 or by a processor within advanced gateway 610.

The flow begins in block 802 where a command is received from a service provider at advanced gateway 610. Any service provider coupled to advanced gateway 610, and more particularly coupled to service provider interface 622, can send a command. In one embodiment, the commands can be Get and Set commands. Proceeding to block 804, the command is analyzed and a physical interface associated with the command is determined. In one embodiment, forwarding entity 704 can analyze the received command including command arguments such an address (or MAC address) and can select the physical interface in accordance with the received command and address. Proceeding to block 806, the command is sent to the user device indicated in the command through the selected physical interface. In one embodiment, the command is sent by forwarding entity 704.

Proceeding now to block 808, advanced gateway 610 can receive a response at the selected physical interface. As described above, a user device can send a response responsive to receiving a command. The response can be received by the selected physical interface and received by forwarding entity 704. Proceeding next to block 810, the response can be sent to the service provider and the flow ends. In one embodiment, the response is sent to the service provider that sent the command described in block 802.

It should be understood that FIGS. 1-7 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 9 is a block diagram of an exemplary embodiment of an electronic device 900 including a rate adaptive physical interface for network. In some implementations, the electronic device 900 may be one of a laptop computer, a tablet computer, a mobile phone, a powerline communication device, a smart appliance (PDA), access point or other electronic systems. The electronic device 900 can include processor unit 902 (possibly including multiple processors, multiple cores, multiple nodes, and implementing multi-threading, etc.). The electronic device 900 can also include memory unit 906. Memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Electronic device 900 can also include bus 910 (e.g., PCI, ISA, PCI-Express, HyperTransport®, InfiniBand®, NuBus, AHB, AXI, etc.), and local network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, electronic device 900 may support multiple network interfaces—each of which is configured to couple the electronic device 900 to a different communication network.

Broadband interfaces module 908 can include elements and modules described in conjunction with broadband network interfaces 104. In one embodiment, broadband interfaces module 908 can include functionality to transmit and receive data from broadband service providers such as cellular network providers, DSL network providers and the like.

The memory unit 906 can embody functionality to implement embodiments described in FIGS. 1-8 above. For example, in one embodiment, memory unit 906 can include one or more functionalities that facilitate determining traffic characteristics and selecting broadband network interfaces in accordance with performance attributes Any one of these functionalities may be partially (or entirely) implemented in hardware and/or on the processing unit 902. For example, the functionality may be implemented with an application specific integrated circuit, in logic implemented in the processing unit 902, in a co-processor on a peripheral device or card, etc. Further, realizations may include fewer or additional components not illustrated in FIG. 9 (e.g., video cards, audio cards, additional network interfaces, peripheral devices, etc.). Processor unit 902, memory unit 906, local network interfaces 904 and broadband interfaces module 908 are coupled to bus 910. Although illustrated as being coupled to the bus 910, memory unit 906 may be coupled to processor unit 902.

While the embodiments are described with reference to various implementations and exploitations, it will be understood that these embodiments are illustrative and that the scope of the inventive subject matter is not limited to them. In general, techniques for selecting broadband network interfaces as described herein may be implemented with facilities consistent with any hardware or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a gateway having a plurality of broadband interfaces and at least one local network interface different from the plurality of broadband interfaces, the method comprising:

receiving data traffic via the at least one local network interface;

determining a first traffic characteristic associated with the data traffic;

selecting, at the gateway, a first broadband interface based, at least in part, on the first traffic characteristic, wherein selecting the first broadband interface comprises comparing the first traffic characteristic with performance attributes of the plurality of broadband interfaces and determining that the first broadband interface has a first performance attribute that equals or exceeds the first traffic characteristic; and routing the data traffic from the at least one local network interface to the first broadband interface in response to selecting the first broadband interface.

2. The method of claim 1, wherein determining the first traffic characteristic comprises monitoring the data traffic passing through the at least one local network interface.

3. The method of claim 1, wherein the data traffic is received from a device communicatively coupled to the at least one local network interface, wherein the first traffic characteristic is based, at least in part, on a message received from the device, the message indicating the first traffic characteristic.

4. The method of claim 1, wherein selecting the first broadband interface comprises selecting the first broadband interface at a packet level.

5. The method of claim 1, wherein the data traffic comprises a data traffic stream, and wherein the first traffic characteristic is at least one of a minimum bandwidth, a maximum data latency and a round trip time associated with the data traffic stream.

6. The method of claim 1, wherein the first traffic characteristic is a security characteristic regarding transportation of the data traffic.

7. The method of claim 1, wherein selecting the first broadband interface further comprises preferentially selecting a non-wireless broadband interface.

8. The method of claim 1, further comprising:

determining that the first traffic characteristic indicates critical delivery.

9. The method of claim 8, wherein selecting the first broadband interface further comprises selecting a second broadband interface; and wherein routing the data traffic comprises routing the data traffic to both the first broadband interface and the second broadband interface contemperaneously in response to determining that the first traffic characteristic indicates critical delivery.

10. The method of claim 1, wherein the first traffic characteristic is a voice over internet protocol (VoIP) traffic characteristic and the first broadband interface comprises a cellular broadband interface.

11. The method of claim 1, further comprising determining a second traffic characteristic associated with the data traffic, wherein the first broadband interface includes a second performance attribute that equals or exceeds the second traffic characteristic.

12. A network gateway comprising:

a plurality of broadband interfaces configured to communicate with a corresponding plurality of broadband networks;

at least one local network interface configured to receive data traffic, wherein the at least one local network interface is different from the plurality of broadband interfaces; and a logic configured to:

determine a first traffic characteristic associated with the data traffic, select a first broadband interface based, at least in part, on the first traffic characteristic, wherein selection of the first broadband interface comprises a comparison the first traffic characteristic with performance attributes of the plurality of broadband interfaces and a determination that the first broadband interface has a first performance attribute that equals or exceeds the first traffic characteristic, and route the data traffic from the at least one local network interface to the first broadband interface in response to selection of the first broadband interface.

13. The network gateway of claim 12, wherein the logic is further configured to route the data traffic to the first broadband interface in response to a determination that the first performance attribute exceeds the first traffic characteristic by a larger relative amount than corresponding performance attributes of other ones of the plurality of broadband interfaces.

14. The network gateway of claim 12, wherein the logic configured to determine the first traffic characteristic comprises logic configured to monitor the data traffic passing through the at least one local network interface.

15. The network gateway of claim 12, wherein the data traffic is received from a device communicatively coupled to the at least one local network interface, and wherein the first traffic characteristic is based, at least in part, on a message received from the device, the message indicating the first traffic characteristic.

16. The network gateway of claim 12, wherein the logic configured to select the first broadband interface comprises logic configured to select the first broadband interface at a packet level.

17. The network gateway of claim 12, wherein the data traffic comprises a data traffic stream, and wherein the first traffic characteristic is at least one of a minimum bandwidth, a maximum data latency and a round trip time associated with the data traffic stream.

18. The network gateway of claim 12, wherein the first traffic characteristic is a security characteristic regarding transportation of the data traffic and the logic is further configured to preferentially select a non-wireless broadband interface.

19. The network gateway of claim 12, wherein the logic is further configured to:

determine that the first traffic characteristic indicates critical delivery, and route the data traffic to both the first broadband interface and a second broadband interface contemporaneously in response to a determination that the first traffic characteristic indicates critical delivery.

20. The network gateway of claim 12, wherein the first traffic characteristic is a voice over internet protocol (VoIP) traffic attribute and the first broadband interface includes cellular radio technology.

21. A method performed by a first gateway for network communication, the method comprising:

receiving, at a local network interface of the first gateway, data traffic from a network device, wherein the data traffic includes at least one traffic characteristic, wherein the first gateway further includes at least a first broadband interface;

determining that the first broadband interface does not have a first performance attribute sufficient to equal or exceed the at least one traffic characteristic;

locating a second gateway communicably coupled to the first gateway;

determining that the second gateway includes a second broadband interface with a second performance attribute that equals or exceeds the at least one traffic characteristic; and sending at least a portion of the data traffic to the second gateway for transmission via the second broadband interface in response to a determination that the second performance attribute equals or exceeds the at least one traffic characteristic.

22. The method of claim 21, wherein the sending at least the portion of the data traffic to the second gateway comprises determining the second performance attribute for the second broadband interface equals or exceeds the at least one traffic characteristic by a larger relative amount than corresponding performance attributes of other ones of a plurality of broadband interfaces of the first and second gateways.

23. The method of claim 21, further comprising determining the at least one traffic characteristic based, at least in part, on monitoring the data traffic passing through the local network interface.

24. The method of claim 21, wherein the data traffic is received from a device communicatively coupled to the local network interface, and wherein the at least one traffic characteristic is based, at least in part, on a message received from the device, the message indicating the first traffic characteristic.

25. The method of claim 21, wherein the locating the second gateway comprises listening for beacon signals transmitted from the second gateway.

26. The method of claim 21, wherein sending at least the portion of the data traffic to the second gateway comprises sending the portion of the data traffic via a local network between the first and second gateways.

27. The method of claim 21, wherein an operator of the first gateway is different from an operator of the second gateway.

28. The method of claim 27, wherein the operator of the first gateway is billed for sending at least the portion of the data traffic through the second gateway.

29. A method for network communication, the method comprising:

receiving, at a service provider interface of a gateway, a first command from a first service provider, wherein the gateway comprises a plurality of physical interfaces that are separate from the service provider interface;

determining a first command recipient for the first command, wherein the first command recipient is communicatively coupled to the gateway via a first physical interface of the plurality of physical interfaces;

forming a first device specific command based, at least in part, on the first command; and sending the first device specific command to the first command recipient via the first physical interface of the gateway.

30. The method of claim 29, further comprising:

receiving, at the first physical interface, a response from the first command recipient;

formatting the response for the first service provider; and sending the response to the first service provider via the service provider interface.

31. The method of claim 29, further comprising receiving, at the service provider interface, a second command from a second service provider different from the first service provider.

32. The method of claim 29, wherein the first command is received in response to a user input at a website of the first service provider.

33. The method of claim 31, further comprising:
determining a second command recipient for the second command wherein the second command recipient is communicatively coupled to the gateway via a second physical interface of the plurality of physical interfaces;
forming a second device specific command based, at least in part, on the second command; and
sending the second device specific command to the second command recipient via the second physical interface.

34. A non-transitory machine-readable storage media having instructions stored therein which, when executed by a processor of a gateway having a plurality of broadband interfaces and at least one local network interface different from the plurality of broadband interfaces, cause the gateway to perform operations that comprise:
receiving data traffic via the at least one local network interface;
determining a first traffic characteristic associated with the data traffic;
selecting, at the gateway, a first broadband interface based, at least in part, on the first traffic characteristic, wherein selecting the first broadband interface comprises comparing the first traffic characteristic with performance attributes of the plurality of broadband interfaces and determining that the first broadband interface has a first performance attribute that equals or exceeds the first traffic characteristic; and
routing the data traffic from the at least one local network interface to the first broadband interface in response to selecting the first broadband interface.

35. The non-transitory machine-readable storage media of claim 34, wherein the operations for determining the first traffic characteristic further comprise operations for monitoring the data traffic passing through the at least one local network interface.

36. The non-transitory machine-readable storage media of claim 34, wherein the data traffic is received from a device communicatively coupled to the at least one local network interface, and wherein the first traffic characteristic is based, at least in part, on a message received from the device, the message indicating the first traffic characteristic.

37. The non-transitory machine-readable storage media of claim 34, wherein said selecting the first broadband interface comprises selecting the first broadband interface at a packet level.

38. The non-transitory machine-readable storage media of claim 34, wherein the data traffic comprises a data traffic stream, and wherein the first traffic characteristic is at least one of a minimum bandwidth, a maximum data latency and a round trip time associated with the data traffic stream.

39. A system comprising:
a first gateway, including a local network interface and at least a first broadband network interface, wherein the first gateway is configured to:
receive data traffic with a traffic characteristic via the local network interface;
determine that the first broadband network interface does not have a first performance attribute sufficient to equal or exceed the traffic characteristic;
locate a second gateway communicably coupled to the first gateway;
determine that the second gateway includes a second broadband interface with a second performance attribute that equals or exceeds the traffic characteristic; and
send at least a portion of the data traffic to the second gateway for transmission via the second broadband interface in response to a determination that the second performance attribute equals or exceeds the traffic characteristic; and
the second gateway configured to:
receive at least the portion of the data traffic from the first gateway; and
transmit at least the portion of the data traffic via the second broadband interface.

40. The system of claim 39, wherein the traffic characteristic is determined based, at least in part, on monitoring data passing through the local network interface.

41. The system of claim 39, wherein the data traffic is received from a device communicatively coupled to the local network interface, and wherein the traffic characteristic is based, at least in part, on a message received from the device, the message indicating the first traffic characteristic.

42. The system of claim 39, wherein an operator of the first gateway is different from an operator of the second gateway.

43. The system of claim 42, wherein the operator of the first gateway is billed for sending at least the portion of the data traffic by the second gateway.

* * * * *